United States Patent [19]

Serata

[11] Patent Number: 4,733,567
[45] Date of Patent: Mar. 29, 1988

[54] METHOD AND APPARATUS FOR MEASURING IN SITU EARTHEN STRESSES AND PROPERTIES USING A BOREHOLE PROBE

[76] Inventor: Shosei Serata, 1229 - 8th St., Berkeley, Calif. 94710

[21] Appl. No.: 877,405

[22] Filed: Jun. 23, 1986

[51] Int. Cl.$^4$ ............................................. G01N 33/24
[52] U.S. Cl. ......................................................... 73/784
[58] Field of Search ................... 73/151, 84, 801, 784, 73/783

[56] References Cited

U.S. PATENT DOCUMENTS

| | | | |
|---|---|---|---|
| 3,442,123 | 5/1969 | Broise | 73/784 |
| 3,583,219 | 6/1971 | Lunstroth | 73/151 |
| 3,796,091 | 3/1974 | Serata | 73/784 |
| 3,858,441 | 1/1975 | Lomeau | 73/784 |
| 3,896,663 | 7/1975 | Ogura | 73/784 |
| 3,961,524 | 6/1976 | de la Cruz | 73/783 |
| 4,030,345 | 6/1977 | Edmond et al. | 73/784 |

FOREIGN PATENT DOCUMENTS

| | | | |
|---|---|---|---|
| 56-60330 | 5/1981 | Japan | 73/151 |
| 0167017 | 12/1981 | Japan | 73/84 |
| 0241082 | 12/1969 | U.S.S.R. | 73/784 |
| 0429311 | 10/1974 | U.S.S.R. | 73/784 |
| 0473828 | 9/1985 | U.S.S.R. | 73/784 |

Primary Examiner—Stewart J. Levy
Assistant Examiner—Robert R. Raevis
Attorney, Agent, or Firm—Harris Zimmerman; Howard Cohen

[57] ABSTRACT

A borehold probe includes a soft outer plastic cylinder secured to a central mandrel and inflatable by hydraulic pressure conducted therethrough to impinge upon the sidewall of a borehole with controlled pressure. A plurality of LVDT diameter sensors is secured to the probe in planes perpendicular to the axis thereof and spaced angularly thereabout. A plurality of acoustic transducers is also secured to the exterior of the probe to monitor acoustic emissions as well as to survey the earthen media with ultrasonic emissions. The cylinder inflation pressure is increased gradually to exceed both the tensil strength of the media and also the principal stress therein to initiate fracture of the media surrounding the borehole. The cylinder is then deflated to unload the fractured media, and gradually reinflated to first elastically deform the fractured media and then re-expand the fractures previously created. The diameter data together with the hydraulic pressure and the acoustic emissions data and ultrasonic data are analyzed to determine the major and minor stress fields in the media, and also the tensile strength, yield strength, and deformation characteristics of the borehole media.

9 Claims, 14 Drawing Figures

FIG_1

FIG_2

FIG_3

FIG_5

FIG_4

FIG_6

FIG_10

FIG_11

P-D RELATION UNDER CYCLIC LOADING

FIG_12

FIG_13
P-D CURVES RELATING TO PRINCIPAL STRESS DIRECTIONS & INDICATING METHOD OF DETECTING CRACKS $$\sigma_\theta = 3Q_0 - P_0 \quad (1)$$
$$\sigma_\theta = 3P_0 - Q_0 \quad (2)$$

FIG_14

METHOD AND APPARATUS FOR MEASURING IN SITU EARTHEN STRESSES AND PROPERTIES USING A BOREHOLE PROBE

BACKGROUND OF THE INVENTION

The accurate measurement of the insitu stress states and mechanical properties of the ground media is the most fundamental requirement for proper analysis and sound design of earthen structures, underground openings, dams, foundations, and the like. Such information is also vital in determining the likelihood of failure of critical installations located near fault systems, such as nuclear power generating facilities in the Pacific Rim countries.

Methods and devices have been developed in the prior art to analyze the stress states and material properties of ground media, including pressure meters, hydraulic fracturing devices, and overcoring methods. A complete discussion of the pertinent prior art is provided in U.S. Pat. Nos. 3,796,901, of Mar. 12, 1974, and 4,149,409, of Apr. 17, 1979, both issued to Shosei Serata. In general, the prior art is deficient in that it has not been possible to analyze ground media which is non-homogeneous and does not obey idealized elastic conditions, such as fractured, permeable, non-elastic, or ductile media. Furthermore, the limited data that may be obtained is derived only after extensive laboratory work and data analysis, quite contrary to the ideal goal of virtual real-time measurement of earthen properties and stress states.

SUMMARY OF THE PRESENT INVENTION

The present invention generally comprises a method and apparatus for determining the principle stresses as well as material properties such as tensile strenth, shear strength, and deformation characteristics in earthen media surrounding a borehole. A salient feature of the invention is that it can provide complete stress and property data in a very short time, approximately one to two orders of magnitude faster than prior art methods and devices. The invention is also unique in that it can be used effectively to analyze complex ground formations, such as hard-brittle, soft-ductile, fractured, and stratified ground.

The apparatus of the present invention includes a unique borehole probe. One embodiment of the borehole probe includes a soft outer plastic cylinder secured to a central mandrel and inflatable by hydraulic pressure conducted therethrough to impinge upon the sidewall of a borehole with controlled, time-varying pressure. A plurality of LVDT diameter sensors are secured to the probe in planes perpendicular to the axis thereof and spaced angularly thereabout. A plurality of acoustic transducers is also secured to the exterior of the probe to monitor acoustic emissions and to survey the earthen media with active ultrasonic scanning. The cylinder inflation pressure is increased gradually to exceed both the tensile strength of the media and also the maximum and minimum tangential stresses therein to initiate fracture of the media surrounding the borehole. The cylinder is then deflated to unload the fractured media, and gradually reinflated to first elastically deform the fractured media and then re-expand the factures previously created. The test may be repeated at incremental angles about the borehole axis to resolve the angular orientation of the principle stress vectors. The diameter data together with the hydraulic pressure readings and the acoustic emissions data and ultrasonic scanning data are correlated and analyzed to determine the major and minor stress fields in the media, and also the tensile strength and yield strength of the borehole media.

The embodiment described above may be adpated for differing borehole diameters and pressure and elasticity requirements by providing interchangable plastic cylinders of differing thicknesses and materials. Another embodiment of the borehole probe adapted for extremely high pressure work includes a plastic cylinder which is reinforced with a plurality of high strength cables extending longitudinally and disposed about the peripheral surface of the cylinder in sleeve-like fashion. An outer layer of coil springs extends annularly about the cable sleeve to cause contraction of the assembly during hydraulic deflation and assure removability of the device from the borehole. A plurality of strain gauges are secured within the probe and coupled through cantilever assemblies to sensing needles extending outwardly to the surface of the probe to measure the diametrical expansion of the probe under hydraulic expansion.

Although the borehole probe is designed for the measurement of stresses and material properties, it can also be used as a powerful rock breaker. The probe is found to be especially effective for breaking extremely hard rocks. Rock breaking by the probe is an alternative to conventional blasting methods in ground where such blasting is not acceptable due to possible damage from the blasting.

DESCRIPTION OF THE PREFERRED EMBODIMENT

Figure 6:
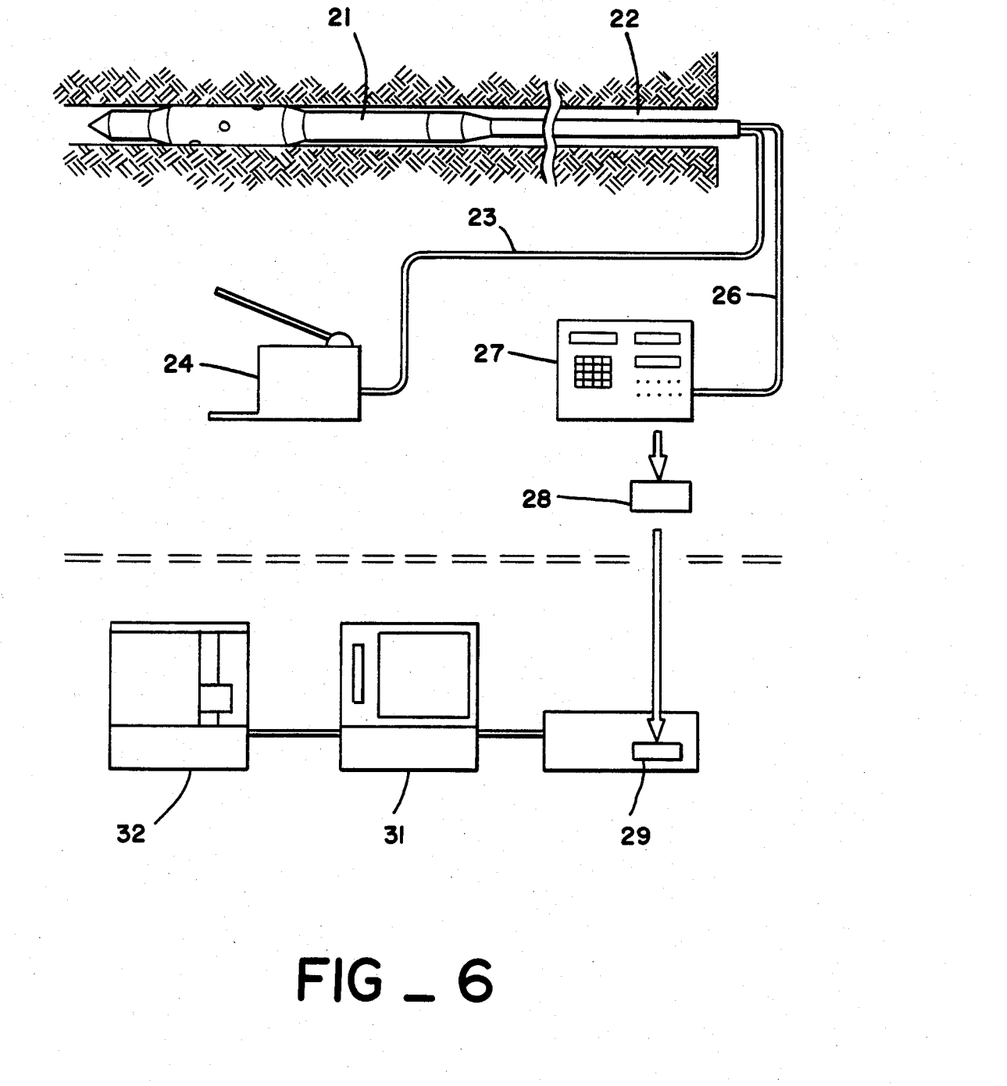
FIG. 6 is a block diagram of the stress and property measuring system of the present invention.

The present invention generally comprises a method and apparatus for determining the principle stress vectors in ground media, and also to determine mechanical properties such as tensile strength, yield strength, and deformation characteristics of the ground media. With reference to FIG. 6, the apparatus includes a probe unit 21 which is adapted to be received within a borehole 22 and to interact with the sidewall thereof at selected depths and angular orientations about the axis of the borehole. The probe unit 21 is connected through an hydraulic cable 23 to a pump 24 disposed outside the borehole and adapted to provide hydraulic pressure to expand portions of the probe 21 against the sidewall of the borehole.

The probe 21 is also connected through an electrical cable 26 to a digital data recorder 27 which receives all the data from the diameter sensors and acoustic sensors mounted on the probe 21. This data is formatted and recorded on a magnetic media 28. The recorded data is retrieved through a playback unit 29, and processes and analyzed by a computer and graphics system 31. The output data concerning stress states and properties of the ground media may be printed by a graphics plotter 32, or displayed on the video output of the system 31.

Figures 1, 2:
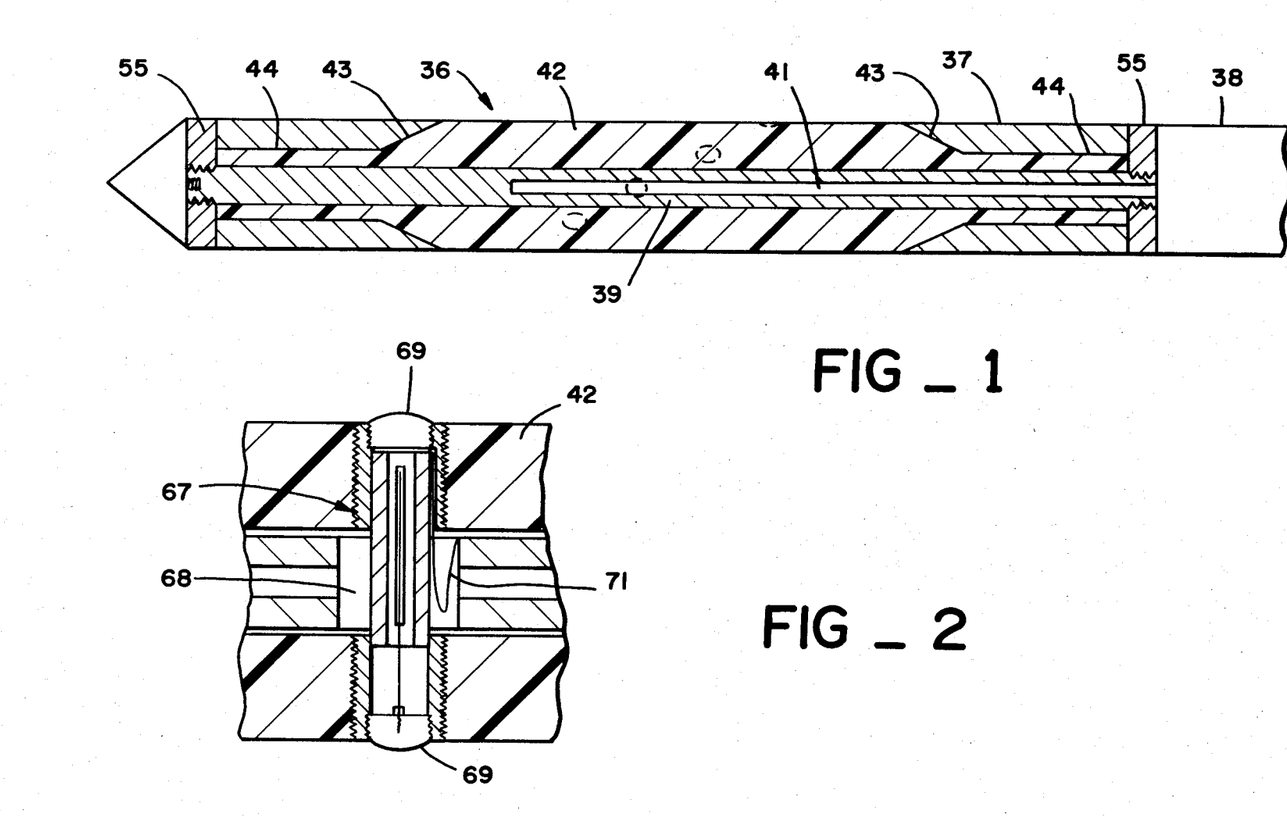
FIG. 1 is a cross-sectional elevation of one embodiment of the borehole probe of the present invention.
FIG. 2 is an enlarged cross-sectional view of the LVDT assembly of the embodiment depicted in FIG. 1.
Figure 7:
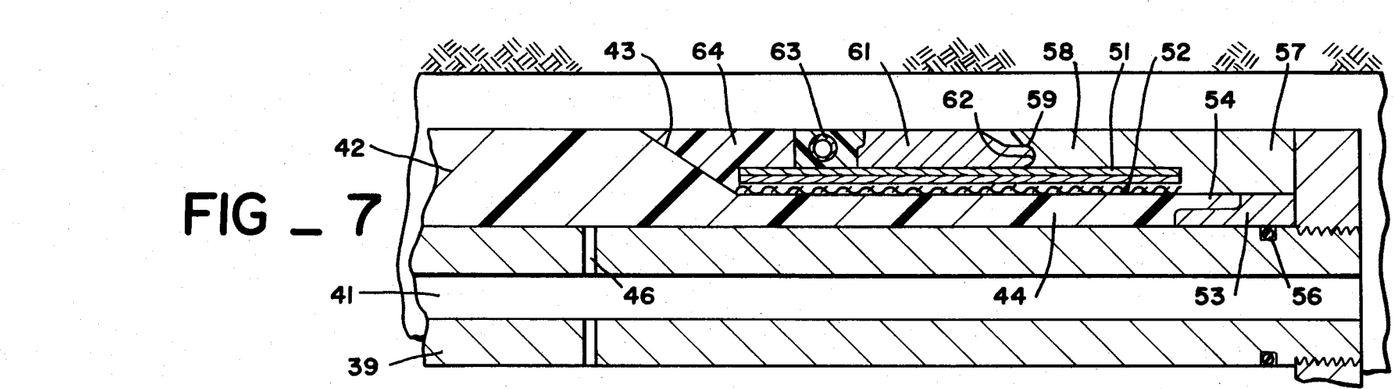
FIG. 7 is an enlarged cross-sectional detailed view of the end cap assembly of the embodiment of FIGS. 1-5, shown in the deflated condition.
Figure 8:
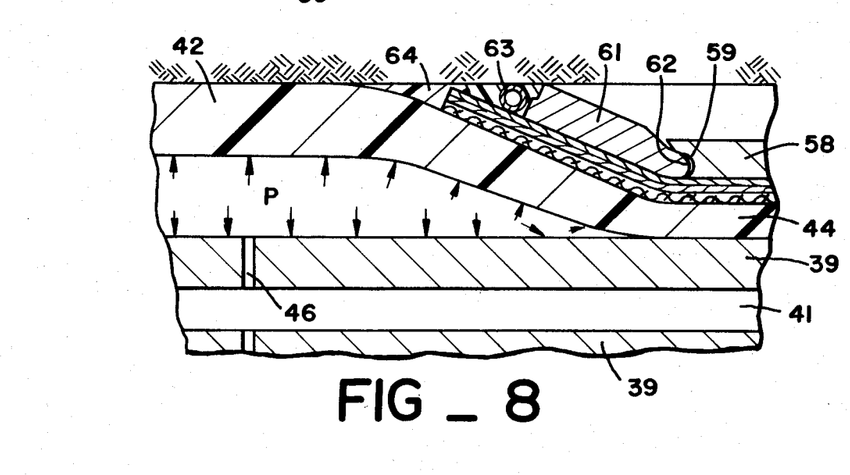
FIG. 8 is a cross-sectional detailed view as in FIG. 7, showing the cylinder and end assembly in the inflated disposition.
Figure 9:
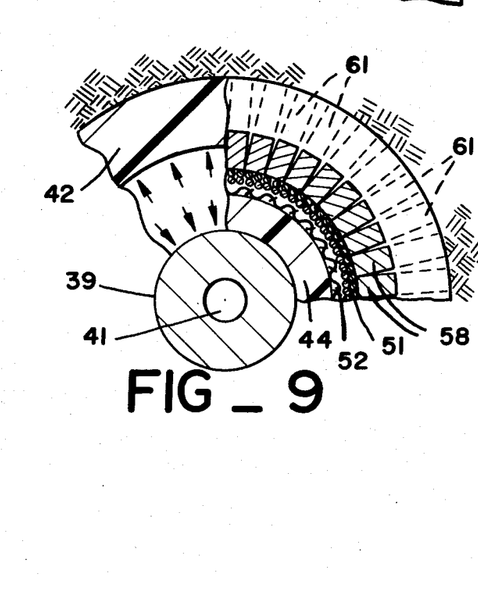
FIG. 9 is a transaxial cross-sectional end view of the end cap assembly of FIGS. 7 and 8.
Figure 10:
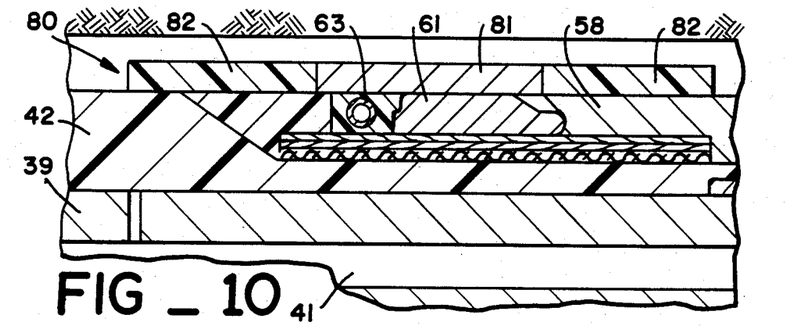
FIG. 10 is a cross-sectional detailed view of a high expansion adaption of the probe structure of the previous Figures, shown in the deflated condition.
Figure 11:
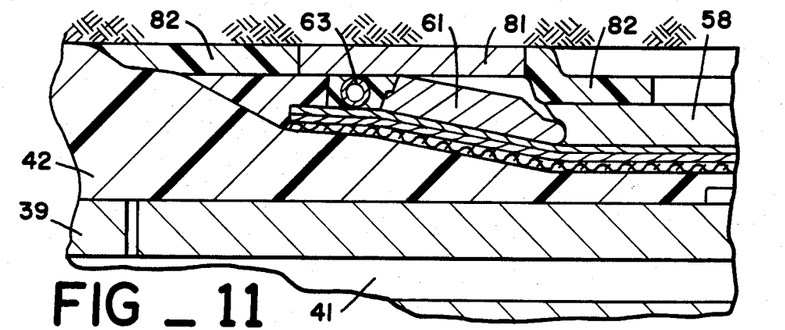
FIG. 11 is a cross-sectional detailed view as in FIG. 10, shown in the hydraulically inflated disposition.

With reference to FIGS. 1, 2, and 7, one embodiment 36 of the borehole probe 21 includes an expandable cylindrical section 37 which is connected in end adjacent relationship to a cylindrical electronics section 38. The electronics section includes circuitry for amplifying signals from sensors, and may also include analog-digital signal converting circuitry. The expandable section 37 is comprised of a central mandrel 38 disposed coaxially and including a central bore 41 therein. A cylindrical member 42 is secured about the mandrel in sleeve-like fashion, the member 42 being formed of a soft, elastic plastic material of generally high yield strength. The opposed ends of the cylindrical member 42 include tapered portions 43 which are joined to end portions 44 of narrow diameter. As shown in FIGS. 7 and 8, the mandrel includes hydraulic passages 46 extending from the bore 41 to the interstitial space between the peripheral surfaces of the mandrel and the interior surface of the member 42. One end of the bore 41 is connected to the hydraulic supply line 23 to deliver pressurized fluid through the passages 46 and cause radial expansion of the member 42 against the sidewall of the borehole. The pressure delivered can be selectively varied to cause expansion and fracture of the earthen mediam programmed stages, as will be explained below.

A salient feature of the present invention is the construction of the end portions of the section 37 which permits substantial radial expansion of the medial portion thereof while retaining and confining the substantial hydraulic pressure necessary to expand and fracture the borehole wall. This construction is accomplished by a detachable cylindrical unti end cap assembly 57 fitted onto narrow diameter portions 44 of the cylinder 42. A steel ring 53 is bonded to the respective distal end 54 of the cylinder 42. An O-ring seal 56 blocks hydraulic leakage between the mandrel and the ring 53. An end cap 55 is received about the end assembly and threaded to the mandrel to retain the assembly. The end cap assembly includes a steel cylinder 58, a plurality of briding blocks 61 arrayed in equal annular spacing, a coil spring 63, and two cylindrical, sleeve-like layers 51 of fine steel cables, all molded together into a single unit using soft urethane or similar synthetic polymer material. Each bridging block 61 includes a rounded end 62 which is fitted into a groove 59 formed in the annular end surface of the steel cylinder 58. As the probe expands, each block 61 rotates outwardly in its engagement in the groove 59 to provide an umbrella-like opening of the end cap assembly to bridge the large gap between the probe and borehole wall, as illustrated in FIG. 8. It may be appreciated that the outward flare of the groove 59 permits the bridging blocks to rotate outwardly about their rounded ends while being retained in the groove. The cable layers 51 are provided to form a barrier which prevents the hydraulic pressure from driving the cylinder portion 44 into the space between the bridging blocks.

In the preferred embodiment there are approximately 40 of the retaining blocks 61, this number being large enough to minimize the separation between the individual blocks when the device is expanded, yet not too large to weaken the strength of the individual blocks. The rounded shape of the base of each block provides no sharp geometric change at the junction with the fingers when the device is expanded.

The ring 63, which is a coil spring, is disposed adjacent to the tapered portion 43 of the cylinder. The ring 63 is positioned to limit the outward radial expansion of the ring-like array of blocks 61 and of the proximal ends of the cable layers 51. The interstitial spaces among the individual components of the end cap are filled with a soft, easily deformed plastic or synthetic polymer substance which joins the components into a cohesive assembly. The ring 63 is positioned to prevent the soft plastic from extruding into the space between the individual blocks under pressure.

As shown in FIG. 8, a charge of hydraulic fluid under a pressure P may be pumped into the bore 41 to expand the cylinder 42. In fact, the medial portion of the cylinder 42 expands, while the distal end portions are retained by the end cap and undergo little expansion. The sloping zone between the substantial radial expansion at the middle and the unexpanded ends are supported by the end cap. This flexible mechanical seal accommodates substantial radial expansion and contraction while retaining the high pressure hydraulic fluid. It should be noted that this probe construction has been used effectively at hydraulic pressure at and above 10,000 psi, whereas most prior art devices operate below 1,000 psi and few can sustain as much as 3,000 psi.

The section 37 also includes devices for mearusing the diametrical changes of the cylinder 42 as it is expanded against the borehole wall under varying hydraulic pressures. With reference to FIGS. 1 and 2, a plurality of LVDT diameter sensors 67 is secured to the section 37, each sensor 67 being disposed in a transaxial, radial bore 68 extending through the mandrel and the cylinder 42. Each bore 68 is sealed at each end by a threaded plug 69. The LVDT core is secured to one plug 69, and the coil is secured to the other. The relative movement between the core and coil causes inductive changes therebetween which affect a signal passing through wires 71 extending to the electronics section 38. The LVDT sensors are arrayed in increments of 45° about the axis of the device, to measure angular variations in borehole wall deformation under conditions of predetermined cyclic loading by the member 42 in accordance with the present invention.

It should be noted that the probe section 37 is designed to employ any one of a plurality of plastic cylinder members 42 of varying thickness, elasticity, and the like. The end cap construction permits the selection and interchange of cylinder members 42, according to the expected nature of the ground media and the level of hydraulic pressure to be used. The removability of the LVDT sensors from the cylinder members hastens their interchange, so that the instrument may be modified quickly in the field to accommodate in situ conditions.

Figure 3:
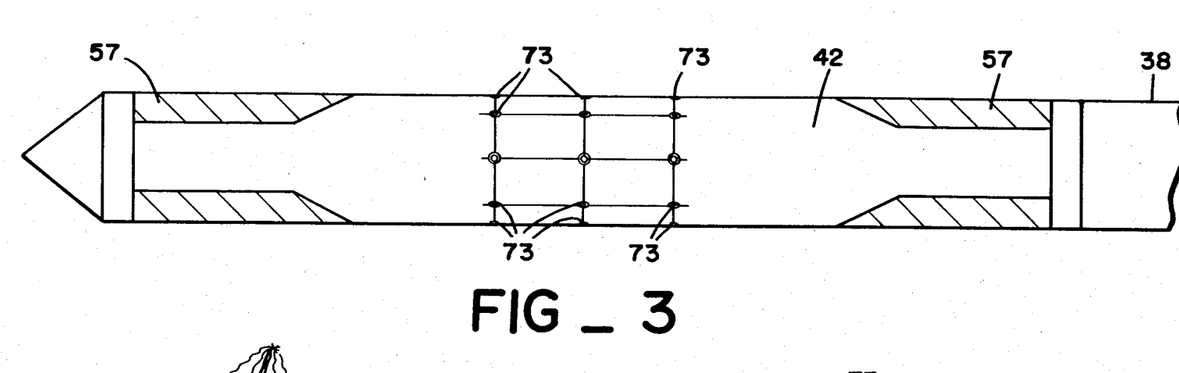
FIG. 3 is a partially cutaway elevation of the probe depicted in FIG. 1, showing the acoustic transducer network on the surface of the probe.

Another salient feature of the instrument is the provision of a plurality of acoustic transducers 73 secured to the medial portion of the outer loading surface of the cylinder member 42. The transducers 73, which may comprise piezoelectric crystals or polymer film, are adhered to the surface on the pattern of pural circles about the cylinder, the transducers being disposed at equal angles thereabout. The lead wires may be passed through small diameter radial ports in the cylinder which are filled and sealed with a suitable plastic or resin material.

Figure 4:
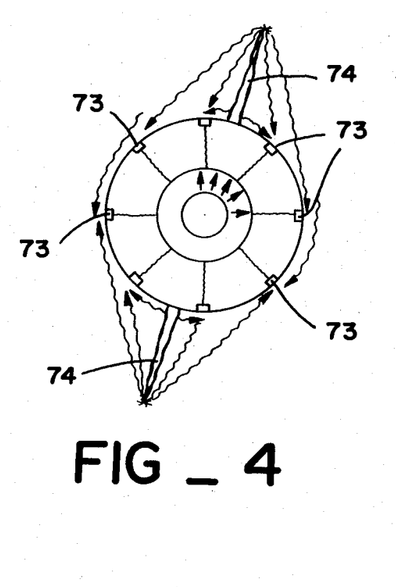
FIG. 4 is a transaxial cross-sectional schematic view of the acoustic transducer network of FIG. 3.

The transducers may act as both acoustic emitters and acoustic sensors, For example, with reference to FIG. 4, the transducers may be used as an acoustic monitoring network to pick up acoustic emissions from the ground median which accompany events such as fracture failure. Such events, which often appear well-defined in idealized graphs but not necessarily so in pressure vs. diameter expansion data, must be detected by correlating acoustic emissions of the ground media with diameter expansion of the borehole. When the cylinder 42 expands sufficiently to initiate fracture in the borehole wall media, the fracture 74 radiates acoustic energy which traverses paths of differing length to reach the various transducer sensors 73. The time delay in the received signals, together with the phase relationships and the wave forms, can be used to determine information such as:

1. Nature of the failure: Distinction between brittle fracture and ductile shear in the borehole boundary failure;

2. Failure location: Location of the failure events, for both brittle and ductile failures;

3. Failure pressure: Loading pressure levels for initiation of failure;

4. Failure growth: Speed and extend of the failures in both brittle and ductile grounds is related to the load pressure;

5. Orientation distribution: Orientation and distribution of the failing events around the borehole in relation to the loading pressure which causes those events.

Figure 5:
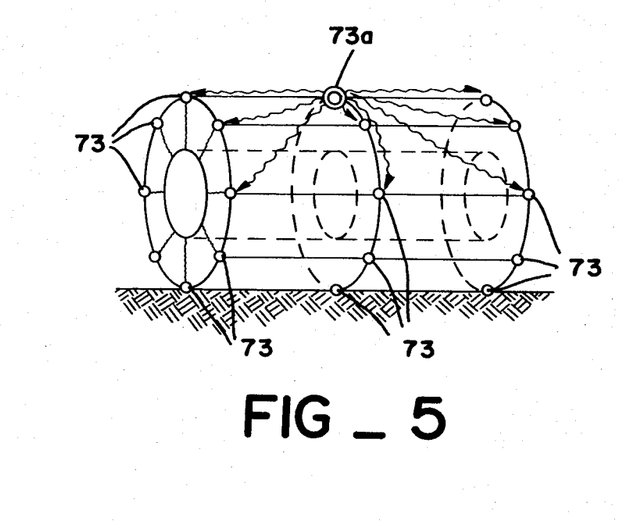
FIG. 5 is a schematic perspective view of the acoustic transducer network of FIGS. 3 and 4.

The acoustic transducers may also be used as an active sonar network to probe the ground media around the borehole, as depicted in FIG. 5. One of the transducers 73a is driven by an AC signal to radiate acoustically at high frequency. This signal is conducted and reflected through the ground media to the remaining transducers 73, which are operated as passive receivers. The acoustic signals can be processed, using techniques well known in the prior art, to determine information such as the following:

1. Initial geomechanical conditions: The borehole media may be probed prior to stress testing to determine intial conditions such as homogeniety, isotropy, and anomalies:

2. Initial fractures: Presence, location, and extent of both macroscopic and microscopic fractures existing prior to the borehole loading;

3. Changing fracture conditions: Observing changes of the above fractures during and after cyclic loading:

4. Created fractures: Detection of initiation, growth, and contraction of fractures created by the loading, distinguishing from the natural fractures:

5. Yielding failure: Initiation, growth, and distribution of yielding failure distinguished from the fracturing failure in relation to the radial loading of the borehole wall.

It should be noted that the acoustic transducer network may be switched rapidly from passive acoustic monitoring to active sonar probing, so that both data streams may be correlated in virtually continuous fashion.

Figure 12:
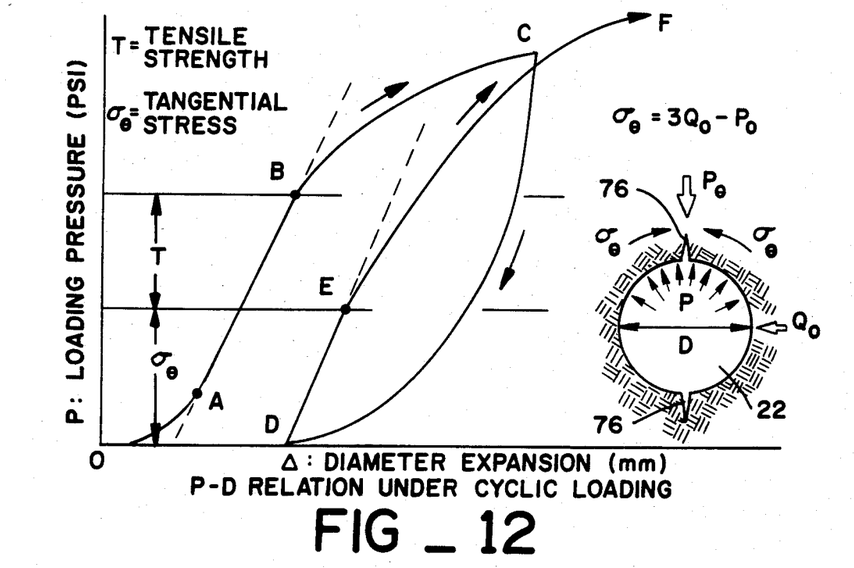
FIG. 12 is a graphical representation of the pressure of recurrent radial hydraulic loading by the probe of the present invention vs. diametrical expansion of the borehole as measured by the probe.

A salient feature of the present invention is the method for determining significant information on ground media, using an instrument such as the probe described in the foregoing. With reference to FIG. 12, it is presumed that the stress field within the earthen media surrounding borehole 22 can be resolved into principal stress vectors $P_0$ and $Q_0$, the two vectors being orthogonal and disposed in a plane perpendicular to the borehole axis. It is also presumed that the media has a tensile strength T and that a tangential stress $v\theta$ exits at the borehole wall boundary. The media may be surveyed ultrasonically before hydraulic loading to find any factures, anomalies, unexpected stress field, and the like. The hydraulic pressure is then increased from zero to point A in FIG. 12, causing initial contact and consolidation between the probe surface and the borehole wall. The pressure is then increased from point A to point B, causing a generally proportional increase in borehole diameter and indicating the modulus of elasticity of the stressed media. At point B both the tensile strendth and the tangential stress of the media are overcome by the radially outward force of the expanding probe, causing initiation of fractures at the borehole boundary. This event may be verified by acoustic emission signals.

The loading pressure is increased from points B to C, causing an increased rate of expansion with respect to the increasing pressure, due to the fact that the induced fractures 76 are expanding. The hydraulic loading is then reduced to zero permitting the probe to deflate and the borehole wall to contract. However, due to the fact that the wall boundary has been substantially fractured, the tensile strength of the media has been reduced virtually to zero, and the media has expanded, resulting in non-recoverable deformation 0-D. Another loading cycle is then commenced, the pressure increasing from points D to E. This step causes elastic deformation before the fracture planes open once more at pressure E. From point E to point F the increasing pressure causes increasing expansion as the fracture planes re-open. It is significant that the fracture planes begin to expand at the lower pressure (point E) in the second cycle of hydraulic loading, due to the fact that there is no more tensile strength in the fractured media. Thus the pressure at point E comprises the tangential stress $v\theta$ alone, and this important stress state is thus determined.

Figure 14:
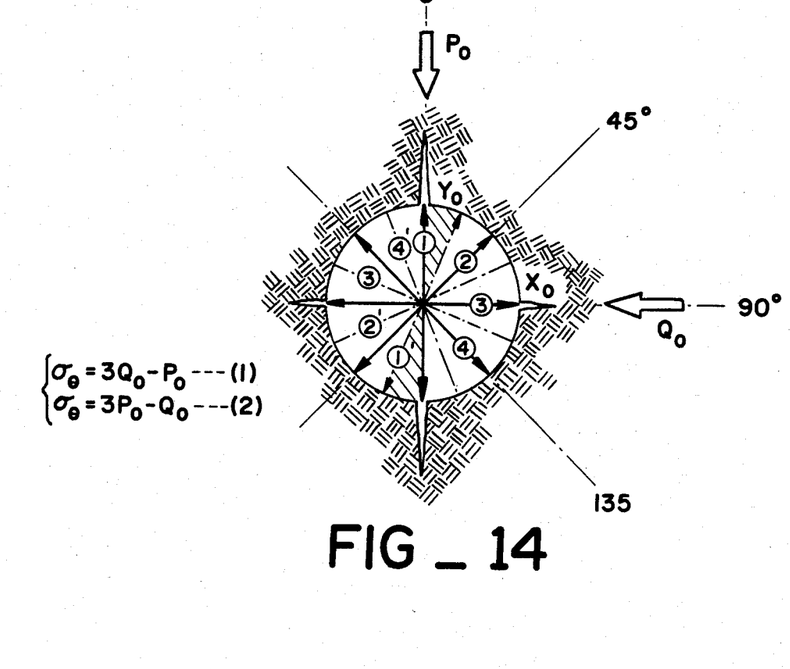
FIG. 14 is a schematic view of the borehole probe orientation with respect to the axis thereof, depicting the angular relationships of FIG. 13.

FIG. 14 shows the orientation of a set of four LVDTs mounted at 45° intervals in a probe set at the normal position, that is, LVDTs 1 and 3 are set in the direction of the maximum and minimum principal stresses $P_0$ and $Q_0$, respectively, In this unique position, which is often apparent before measurement in earth structures, one LVDT measures the diametrical deformation caused by the fracture in the direction perpendicular to the direction of that LVDT. Furthermore, the reading of any LVDT is virtually unaffected by fracture development extending in a parallel or coaxial direction with that LVDT. For example, LVDT 1 measures all the diametrical deformations caused by the fracture in the $Q_0$ direction and none by the fracture in the $P_0$ direction. On the other hand, LVDT 3 measures all the diametrical deformations caused by the fracture in the $P_0$ direction and none by the fracture in the $Q_0$ direction.

Figure 13:
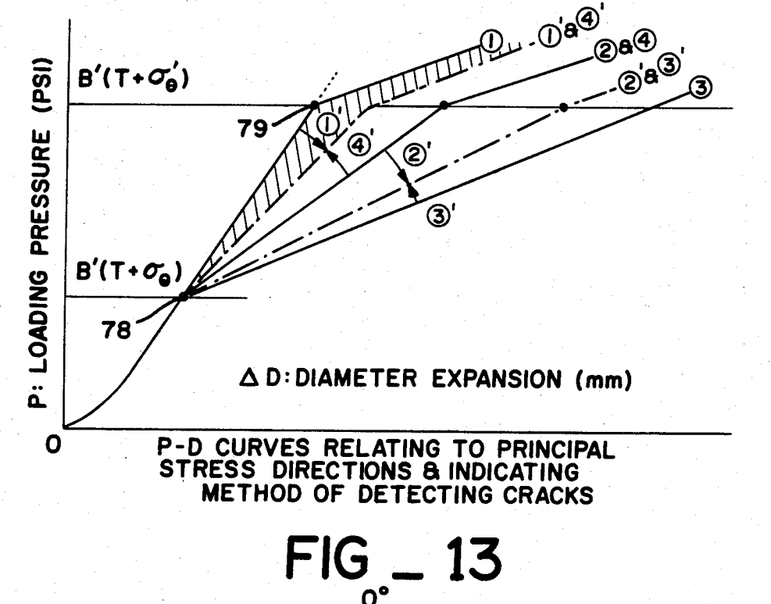
FIG. 13 is a graphical representation of the pressure of radial hydraulic loading of the borehole, in accordance with the invention, vs. diametrical expansion, showing the derivation of the principle stress vectors.

As a result of these relationships between the LVDT orientations and the principal stress vectors, LVDTs 1 and 3 produce corresponding lines 1 and 3 in the pressure-deformation graph of FIG. 13. Also illustrated in FIG. 13 is the measurement obtained from LVDTs 2 and 4, which are receiving generally equal amounts of fracture development effect from the two fracture developments in both the $P_0$ and the $Q_0$ direction. The equal displacement determines generally coincident lines 2 and 4 representing the displacement of the respectively numbered LVDT.

A set of these three curves disclosed initiation, propagation, and orientation of the fracture developement in the $P_0$ and the $Q_0$ directions under continuous increase of hydraulic loading. More specifically, the failure initiation occurs at two different hydraulic loading pressure levels $\beta(78)$ and $\beta'(79)$, as also illustrated in FIG. 13. The difference between $\beta$ and $\beta'$ is caused by the difference between $P_0$ and $Q_0$ values.

In actual field measurements, when the direction of the principal stress directions is not apparent before measurement, the probe may be be placed exactly in the normal orientation described above. In such case of starting measurements at a random orientation, all possible probe orientations relative to the principal stress vectors fall in a rather narrow angular range of excursion from the probe direction of $\phi=0°$ to $\phi=22.5°$. This is graphically shown by the hatched area of the angular orientation as shown in FIG. 14. The full range rotation of the probe from $\phi=0°$ to $\phi=22.5°$ causes the normal set of the p-D lines 1, 2, 3, and 4 to drift to the other extreme set of lines 1', 2', 3', and 4' as depicted by the four arrows of the drift shown in FIG. 13. This characteristic of the results of the method of the present invention indicates that the two fracture initiation pressure levels $\beta$ and $\beta'$ are detected regardless of the probe orientation, although they are most clearly identifiable when the probe is at the normal orientation of $\phi=0°$.

Since the two sets of p-D lines 104 and 1-4 and 1'-4' in FIG. 13 respresent the two extreme probe orientations, direction of the stress orientation can be reasonably well estimated from a first test even with a random orientation of the probe. The accuracy of the stress orientation thus determined at first can be improved by slightly rotating the probe towards the normal orientation. The accuracy will be increased in proportion to the number of trials conducted at different probe orientations. It should be noted also that in this case the $\beta$ and $\beta'$ as well as the E and E' values do not change with respect to the probe orientation.

It is known from classic mechanics that initially the minimum tangential stress on the boundary at $\phi=0°$ is given by the relationship $$\beta = v_\theta + T = 3Q_o - P_o + T$$

and the maximum tangential stress at $\phi=90°$ ($Q_0$ direction) is $$\beta' = v_{\theta'} + T = 3P_o - Q_o + T$$

where $\phi' = \phi + 90°$ and T is the tensile strength of the rock. When the expanding pressure is increased from zero to the pressure value at point 78, fracture initiation at $Y_0$ is detected by LVDT 3, yielding a value for $\beta$ and for the sum of the tangential stress and the tensile strength at the $\phi=0°$ position.

The pressure is further increased to the pressure at point 79, causing fracture initiation at $X_0$ (the $\phi=90°$ position) which is detected by LVDT 1. This facture pressure yields a value for $\beta'$ and for the sum of the tangential stress and the tensile strength at the $X_0$ position.

After the set of the two mutually perpendicular fracture planes has been sufficiently expanded in the initial loading process, the pressure is completely unloaded in the probe. The loading process just described is then repeated in a manner precisely identical to the initial loading. The reloading results in a graph very similar to the p-D graph of FIG. 13, with points E and E' corresponding to $\beta$ and $\beta'$, respectively. The differences between $\beta$ and E as well as $\beta'$ and E' directly disclose the tensile strength of the surrounding ground observed in the mutually perpendicular directions. Therefore, this strength measurement may reveal certain orientational characteristics of the ground if they exist. (The pressure levels E and E' are obtained directly in the p-D diagram of FIG. 13, in the same way that $\beta$ and $\beta'$ directly determined in the initial loading step). Furthermore, the observed pressures E and E' correspond to the values for sigma sub theta and sigma sub theta prime. From the direct in situ observation of the two pressure levels E and E', the value of the maximum and minimum principle stresses $P_0$ and $Q_0$ are obtained by solving the following simultaneous equations $$E = v_\theta = 3Q_o - P_o$$

$$E' = v_{\theta'} = 3P_o - Q_o$$

It should be noted that any probe orientation would yield the E and E' pressures.

The probe designs and method described in the preceding specification delineate an invention with several unique and salient features, due primarily to the extremely high pressure borehole loading, exceeding 10,000 psi, which is not possible with any prior art measurement system. These novel features include:

1. Comprehensiveness: the ability to determine critical yet comprehensive information on magnitude and orientation of the principal stresses as well as in situ material properties, essential for quantitative analysis and design of earth structures;

2. Combined observations: both deformatinal and acoustic observations are combined to assure the accuracy of the information;

3. Ground complexity: applicable to general ground materials with expected geomechanical complications, including fractures, permeabilities, non-elasticity, and ductility in contrast to the ideally elastic ground model imposed by prior art techniques;

4. Fracture initiation: ability to measure fracture initiation, growth, and contraction in the individual principal stress directions which are essential for accurate determination of the stress conditions and material properties of the naturally complex ground;

5. Fractured ground: ability to determine stress conditions in fractured ground, which has not been possible using prior art techniques;

6. Ductile ground: effective measurement of stresses in ductile ground, which has not been effective using prior art techniques due to their inability to apply extremely high loading pressure;

7. Measurement speed: speed of measuring the stress conditions and material properties which is at least 10 to 1000 times faster than prior art techniques;

8. Applicability: serious limitations imposed on prior art techniques, including maximum loading pressure, borehole depth, ground permeability, initial stress field, and geomechanical complexity of the media are eliminated by the present invention;

9. The expandable probe can be used solely for its expansion effect to break hard rocks effectively and economically, without using the measuring function of the probe.

I claim:

1. A method for determining the material properties and initial stress field in ground media surrounding a borehole, comprising the steps of:

inserting a stress-properties probe into said borehole, expanding an outer portion of said probe under increasing high fluid pressure to impinge upon and deform the borehole wall until the ground media fractures at a pair of mutually perpendicular fracture planes propagating in the maximum and minimum principal stress directions, while simultaneously measuring the diameter expansion of said probe at angular increments thereabout to detect initiation of said pair of fractures and their angular orientation, relieving said high fuild pressure to close said factures, re-expanding said outer portion of said probe under increasing high fluid pressure to re-open said fracture planes, continuously monitoring the diametrical changes of said outer portion of said probe and said fluid pressure to determine the first fluid pressure levels at which said pair of fracture planes are first opened and the fluid pressure levels at which said pair of fracture planes are re-opened, and comparing said first and second pressure levels and the diametrical deformation of said outer portion of said probe to determine the magnitude and orientation of the maximum and minimum principal stresses of the ground media and material properties of the ground media.

2. The method of claim 1, further including the step of simultaneously monitoring the acoustic propagation properties and acoustic emissions of the ground media to verify the initiation, propagation, separation, contraction, and re-opening of said fractures.

3. An apparatus for measuring material properties and ambient stresses in ground media surrounding a borehole, including; a tubular cylindrical member adapted to contain high pressure fluid in the range of 10,000 psi, and to expand elastically in response to said pressure; a pair of end cap assemblies joined to said cylindrical member to limit expansion of the ends thereof and to contain said high pressure fluid; diameter measuring means for determining the expansion of the outer surface of said cylindrical member as a function of loading pressure; wherein the opposed ends of said cylindrical member are tapered in diameter, said end cap assemblies are received and secured about said tapered ends; further including a large plurality of bridging blocks arrayed annularly about said tapered ends, each block extending generally longitudinally with respect to said cylindrical member, said array of bridging blocks being disposed to contain said high pressure fluid at the junction of said end cap assemblies and the expandable cylindrical member of said apparatus; means for joining said bridging blocks to each of said end cap assemblies with limited rotational freedom to permit the bridging blocks to pivot outwardly in umbrella fashion as said cylindrical member expands under high inflating pressure, each end cap assembly including a steel cylinder secured about the distal portion of each of said tapered ends; wherein said means for joining said bridging blocks to said end cap assembly includes an outwardly flared groove in the proximal end surface of each of said steel cylinders, said bridging blocks each including a rounded end adapted to be received in said groove in smoothly rotatably fashion to permit the bridging blocks to pivot outwardly in umbrella fashion as said cylindrical member expands under high inflating pressure; and a pair of concentric, sleeve-like layers of high strength steel cables secured about each of said tapered ends to prevent extrusion of said cylindrical member through said array of bridging blocks under high inflating pressure.

4. The apparatus of claim 3, further including a mandrel extending axially within said cylindrical member, and means for joining said end cap assemblies to opposed ends of said mandrel with sufficient strength to contain fluid pressure in the range of 10,000 psi.

5. The apparatus of claim 3, further including a layer of coil springs secured about the outer surface of said layers of high strength cables, said coils extending annularly thereabout.

6. The apparatus of claim 5, wherein said cylindrical member is formed of resilient elastic material, and said end cap assemblies each include said steel cylinder secured about one end of said apparatus exteriorly of said cable layers and dimensioned to secure the assembly and prevent the penetration of the end portions of the cylindrical member through the layers of steel cable and the array of bridging blocks.

7. The apparatus of claim 3, wherein said diameter measuring means includes two pairs of LVDT sensors secured in said cylindrical member in mutually perpendicular orientation and transverse to the axis of the borehole.

8. The apparatus of claim 3, further including a plurality of acoustic transducers secured to the exterior of said apparatus to impinge directly on the borehole wall and disposed both to pick up acoustic emissions of said ground media under expansion and contraction and to survey said ground media in sonar fashion.

9. A method for determining the material properties and ambient stress field of a portion of ground media surrounding a borehole, the ground media having a tensile strength and a existing tangential stress about the borehole, comprising the steps of:

inserting a stress-materials probe into said borehole, expanding said probe under high pressure to impinge upon and deform the borehole wall, increasing said pressure until the tensile strength and tangential stress of the media are overcome and the media begins to fracture, increasing said pressure further to expand said fracture and destroy the tensile strength of the media, reducing said pressure to substantially zero to deflate said probe, increasing said pressure again to expand said probe until said tangential stress is exceeded and said fracture begins to re-expand, while simultaneously measuring the pressure and the diameter of the probe, and comparing the pressure levels with the initiation of fracture and the reinitiation of fracture to determine the ambient tangential stress, tensile strength, compressive strength, and Young's modulus.

* * * * *